United States Patent
von und zu Liechtenstein

(10) Patent No.: US 10,121,063 B2
(45) Date of Patent: Nov. 6, 2018

(54) WINK GESTURE BASED CONTROL SYSTEM

(71) Applicant: BMT Business Meets Technology Holding AG, Bottighofen (CH)

(72) Inventor: Maximilian Ralph Peter von und zu Liechtenstein, Rorschach (CH)

(73) Assignee: BMT BUSINESS MEETS TECHNOLOGY HOLDING AG (CH)

( * ) Notice: Subject to any disclaimer, the term of this patent is extended or adjusted under 35 U.S.C. 154(b) by 129 days.

(21) Appl. No.: 14/993,134

(22) Filed: Jan. 12, 2016

(65) Prior Publication Data

US 2016/0203359 A1    Jul. 14, 2016

Related U.S. Application Data

(60) Provisional application No. 62/102,235, filed on Jan. 12, 2015.

(51) Int. Cl.
| | |
|---|---|
| G06K 9/00 | (2006.01) |
| G06F 3/01 | (2006.01) |
| G06F 3/023 | (2006.01) |
| G06F 3/0484 | (2013.01) |
| G06F 1/16 | (2006.01) |

(52) U.S. Cl.
CPC .......... *G06K 9/00335* (2013.01); *G06F 3/011* (2013.01); *G06F 3/013* (2013.01); *G06F 3/017* (2013.01); *G06F 3/0233* (2013.01); *G06F 3/0236* (2013.01); *G06F 3/04842* (2013.01); *G06K 9/00604* (2013.01); *G06F 1/163* (2013.01); *G06K 9/00671* (2013.01)

(58) Field of Classification Search
CPC ..... G06F 3/011; G06F 3/017; G06K 9/00604; G06K 9/00335
See application file for complete search history.

(56) References Cited

U.S. PATENT DOCUMENTS

| | | |
|---|---|---|
| 8,836,641 B1 | 9/2014 | Kim |
| 9,171,198 B1 | 10/2015 | Raffle |

(Continued)

FOREIGN PATENT DOCUMENTS

WO    2014/015946    8/2014

OTHER PUBLICATIONS

"Multimodal interaction in an augmented reality scenario", ACM, 2 Penn Plaza, Suite 701—New York: Printed and Received Jan. 15, 2016.
Ismail Haritaoglu: "Infoscope: Link from Real World to Digital Information Space" Lecture Notes in Computer Science: Printed and Received Jan. 15, 2016.
Lo Raymond et al: "Augmediated reality system based on 3D camera selfgesture sensing", 2013 IEEE International Symposium: Printed and Received Jan. 15, 2016.

(Continued)

*Primary Examiner* — Abbas Abdulselam

(57) ABSTRACT

A wink gesture based control technique for selecting, controlling and manipulating virtual objects and smart applications on a display using facial gestures of the user, in particular winking, blinking and squinting movements of the eyes. The wink gesture based control technique utilizes wink gestures of a user to select, control, and manipulate virtual objects on a display. A head mounted device is adapted to allow detection and classification of specific wink gestures. The head mounted device in some embodiments may also be adapted to recognize certain characteristics of the wink gestures, such as duration or amplitude, to allow enhanced navigation of a computer interface.

12 Claims, 17 Drawing Sheets

(56) References Cited

U.S. PATENT DOCUMENTS

| | | | |
|---|---|---|---|
| 2007/0179396 A1* | 8/2007 | Le | A61B 5/0476 600/544 |
| 2011/0158478 A1 | 6/2011 | Yamada | |
| 2014/0078049 A1* | 3/2014 | Parshionikar | G06F 3/017 345/156 |
| 2014/0101608 A1 | 4/2014 | Ryskamp | |
| 2014/0369571 A1* | 12/2014 | Tsukizawa | G06K 9/00248 382/118 |
| 2015/0010207 A1* | 1/2015 | Inada | B60K 35/00 382/103 |
| 2015/0049004 A1* | 2/2015 | Deering | G02B 27/0172 345/8 |
| 2015/0235622 A1* | 8/2015 | Border | G06T 19/006 345/2.3 |
| 2016/0309081 A1* | 10/2016 | Frahm | G06F 3/013 |

OTHER PUBLICATIONS

Vaitukaitis et al: "Eye Gesture Recognition on Portable Devices", UbiComp Sep. 5-Sep. 8, 2012, Pittsburgh: Printed and Received Jan. 15, 2016.

Tanriverdi et al. 2000. Interacting with eye movements in virtual environments. In Proceedings of the SIGCHI conference (CHI '00). ACM, NY: Printed and Received Jan. 15, 2016.

Bulling et al. 2008 EyeMote—Towards Context-Aware Gaming Using Eye Movements Recorded from Wearable Electrooculography: Printed and Received Jan. 15, 2016.

Myers et al. 2015. Wearable silver nanowire dry electrodes for electrophysiological sensing. RSC Advances. The Royal Society of Chemistry: Printed and Received Jan. 15, 2016.

\* cited by examiner

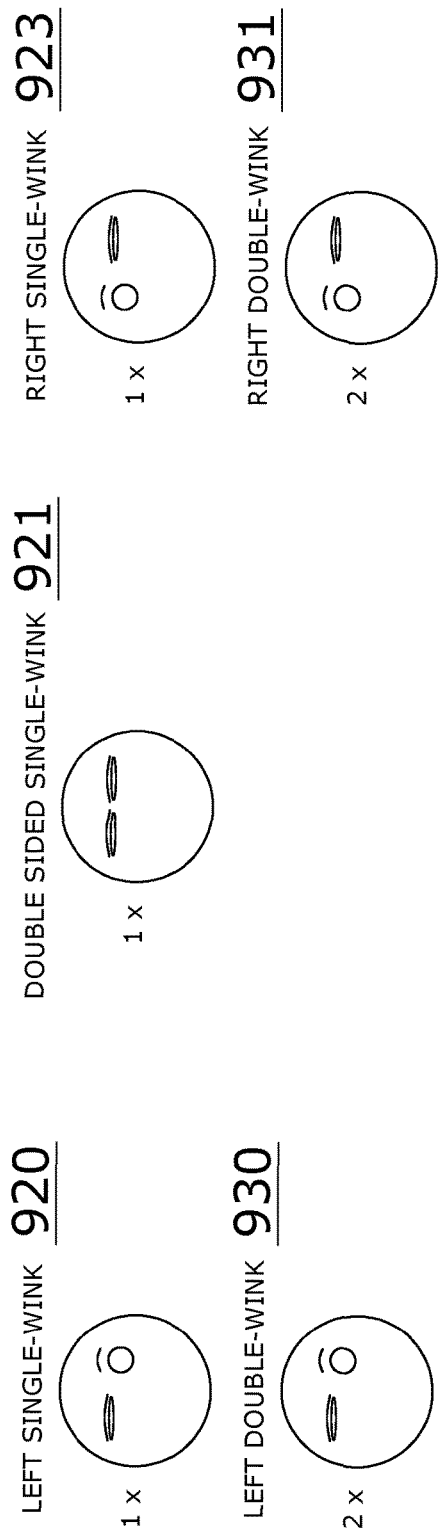

WINK GESTURE BASED CONTROL SYSTEM

CROSS REFERENCE TO RELATED APPLICATIONS

I hereby claim benefit under Title 35, United States Code, Section 119(e) of U.S. provisional patent application Ser. No. 62/102,235 filed Jan. 12, 2015. The 62/102,235 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a wink gesture based control system for selecting, controlling and manipulating virtual objects and smart applications on a head mounted display using wink gestures and facial expressions of the user.

Related Art

Any discussion of the related art throughout the specification should in no way be considered as an admission that such related art is widely known or forms part of common general knowledge in the field.

Digital devices are prevalent throughout the world. For example, mobile smart phones, smart glasses, smart watches, and the like are becoming more and more popular as their functionalities are improved. In some areas of the world, it is rare for an individual to leave the house without relying in some way on such a digital device. This is particularly true in a wide range of industries, where digital automation has resulted in numerous body-worn devices which may control other units from a remote location.

While such digital devices provide a range of functionalities, they typically suffer from the shortcoming that they require the use of hand (by touch or gesture) or speech inputs for operation. For example, smart phones typically include a touchscreen which is utilized to enter nearly all input instructions or to navigate a user interface. This can be particularly burdensome for those without full use of their hands, either due to medical issues such as disabilities or due to the nature of the work being performed. For example, a surgeon will often desire to utilize such a digital device, but would be limited if performing a task that requires both hands, such as surgery. Speech input has recently also gained popularity in controlling digital devices, however there are a host of real-world applications where both speech input and hand gesture input is impossible or undesirable, because the surrounding environment is either too noisy or requires secrecy, which by elimination only leaves input by wink gestures as a practical mode for controlling the user interface of such devices.

SUMMARY

This disclosure provides, in part, a method. The method includes detecting a parametrized wink gesture. The method also includes causing the user interface of a computer system to be controlled and navigated, in response to detecting the wink gesture.

This disclosure also provides, in part, a non-transitory computer-readable medium. The medium has stored therein instructions that, upon execution by a computing device, cause the computing device to perform functions. The functions include detecting a wink gesture. The functions also include translating the parameter intrinsic to the detected wink gesture to corresponding input and control parameters of the user interface of a computing device.

This disclosure also provides, in part, a system of a head mounted device (HMD). The system includes a user interface which can be controlled and navigated by wink gestures. The system also includes a wink gesture detection system. The system also includes a non-transitory computer-readable medium. The medium has stored therein instructions that, upon execution by a computing device, cause the computing device to perform functions. The functions include allowing the user to control smart applications through control inputs comprising wink gestures. The system also includes an eye-tracking system allowing the control of a simulated mouse pointer.

There has thus been outlined, rather broadly, some of the features of the wink gesture based control technique in order that the detailed description thereof may be better understood, and in order that the present contribution to the art may be better appreciated. There are additional features of the wink gesture based control technique that will be described hereinafter and that will form the subject matter of the claims appended hereto. In this respect, before explaining at least one embodiment of the wink gesture based control technique in detail, it is to be understood that the wink gesture based control technique is not limited in its application to the details of construction or to the arrangements of the components set forth in the following description or illustrated in the drawings. The wink gesture based control technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 9B is a second exemplary diagram illustrating potential wink input types.

DETAILED DESCRIPTION

A. Overview.

FIGS. 1 through 12B illustrate an exemplary wink gesture based control system which generally comprises a head mounted device which utilizes wink gestures of a user to select, control, and manipulate virtual objects on a display. The head mounted device may have a display area within a user's field of view in which a user can view an overlay of both physical objects and virtual objects rendered via the display.

Sensors on the head mounted device are utilized to detect and interpret facial gestures or expressions of the user to navigate the region of interest of the display. Sensors may include cameras, electromyography sensors, distance sensors, motion sensors, electrooculography sensors and a variety of other sensors. The sensors may detect facial gestures such as winking, blinking or squinting. The head mounted device is adapted to allow manipulation of any user interface, or of virtual objects populating a head mounted display, in response to specific facial gestures (such as winks, blinks or squints). The head mounted device in some embodiments may also be adapted to recognize certain characteristics of the facial gestures, such as duration or amplitude, to allow enhanced navigation of the region of interest.

B. Device and System Architecture.

The configuration, size, and type of head mounted device may vary widely in different embodiments of the present invention. By way of example and without limitation, the head mounted device could comprise goggles, glasses, a hat, a sweatband, or any other wearable device which may or may not include an integrated display.

Figure 1A:
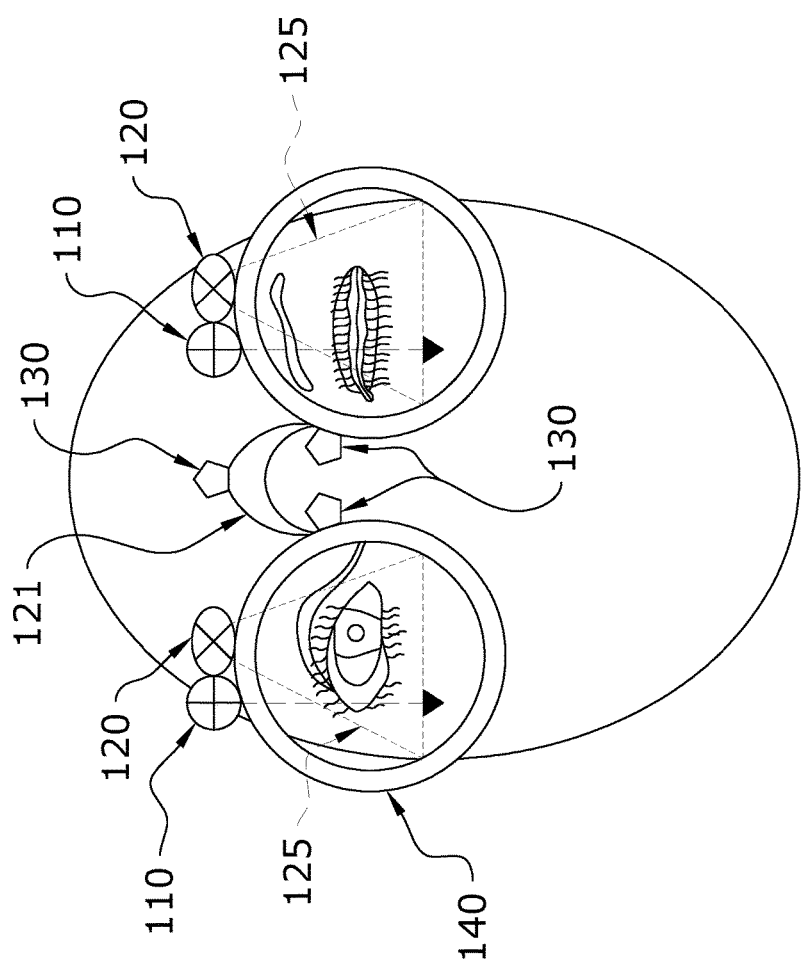
FIG. 1A is a first perspective view of a wink gesture based control system in accordance with an example embodiment.
Figure 1B:
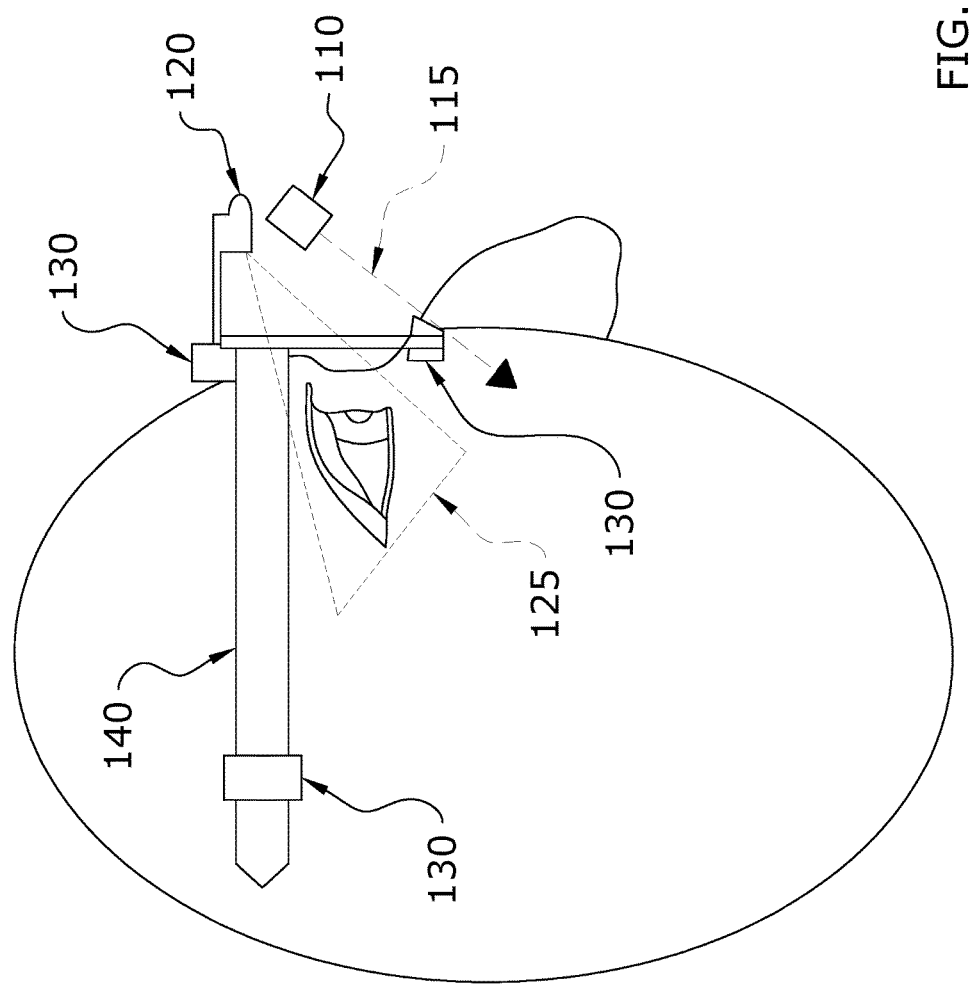
FIG. 1B is a second perspective view of a wink gesture based control system in accordance with an example embodiment.

FIGS. 1A and 1B illustrate an example of a wearable computing system representing a head mounted device 240 (HMD). The HMD 240 includes a face gesture detection system. While FIG. 1 illustrates a head-mountable device as an example of a wearable computing system, other types of wearable computing systems could be used. In particular it is optional to include an internal display with the wearable computing system. A display is required to operate the face gesture detection system; however both external and internal displays are equally suitable for operating the system.

The present invention is particularly suitable for manipulating virtual objects which are superimposed onto a user's field of view in an HMD 240. The wearable computing system consists of a frame 140 which comes into direct skin contact with the user's face around the nose and above the ears. Contact with the nose is established via the nose bridge and nose pads 121. The temple tips 140 are part of the frame and are used to both secure the HMD 240 to the head and to provide an optional placement site for additional surface electrodes.

Attached to the HMD 240 frame are a plurality of sensors whose purpose is to detect wink gestures. The sensors attempt to detect wink gestures by one or more of the following techniques: electromyography (EMG), electrooculography, facial distance sensors, facial motion sensors, visual gesture recognition by image processing. Other kinds of suitable techniques are not excluded. Both the electromyography and electrooculography methods require a plurality of electrode-based sensors 130. These sensors may comprise surface electrodes as opposed to needle electrodes.

The set of EMG electrode sensors may comprise both active electrodes and reference electrodes. A distance and/or motion sensor 110 may be attached to the frame in a position where the eye region can be observed. Of particular significance for distance sensors is the region just below the eye 115 where the Zygmaticus muscle groups flex and contract in response to a squinting gestures of the user. Various other muscle groups may be utilized, with the bulge of the muscle groups being detectable.

In order to implement gesture recognition by image processing a plurality of user-facing cameras 120 may be used. The purpose of these cameras 120 is to illuminate as much of the eye region 125 as possible, including eyebrows, nose bridge and eye sockets. The cameras 120 may either operate in the visual or infrared spectrum. If the infrared spectrum is used, then an infrared lighting system needs to be additionally attached to the HMD 240 in order to illuminate the observed facial regions.

Figure 2:
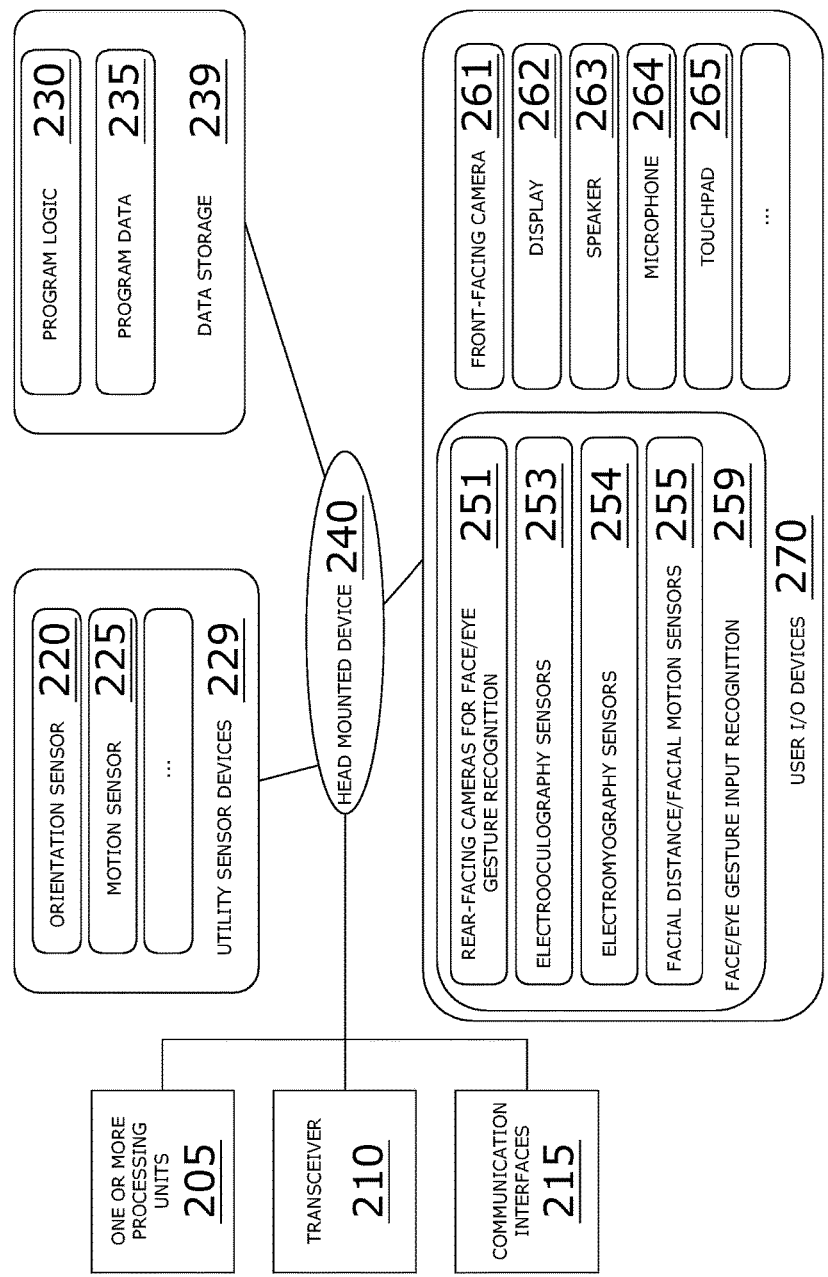
FIG. 2 is a block diagram of an example embodiment.

FIG. 2 shows an exemplary architecture of a typical HMD 240 which may be enhanced with the described input methods by wink gestures. The exemplary HMD 240 depicted in FIG. 2 makes use of one or more processing units 205, a transceiver 210, a plurality of communications interfaces 215, utility sensor devices 229, data storage 239 and user input/output devices 270. The utility sensor devices 229 may consist of sensors such as orientation sensors 220, motion sensors 225 and a various other related sensors. The data storage module 239 stores both program logic 230 and program data 235. The user input/output devices consist of both generic HMD devices such as front-facing camera 261, display 262, speaker 263, microphone 264 or touchpad 265, as well as devices which are primarily dedicated to the recognition of wink gestures 259, namely rear-facing cameras 120 for face/eye gesture recognition 251, electrooculography sensors 253, electromyography sensors 254 and facial distance/motion sensors 255.

i. Visual Wink Gesture Detection System

FIGS. 1A and 1B depict an exemplary method and system for detecting winking and squinting gestures using an HMD 240 through use of a plurality of rear-facing cameras 120 operating either in the visual or infrared band. The rear-facing cameras 120 are used to map the relative positions of pre-defined reference points 330, 331 and 332 on the eye brow 321, upper 331 and lower 330 eye lids of both eyes 322. Other or additional reference points may also be defined.

Figure 3:
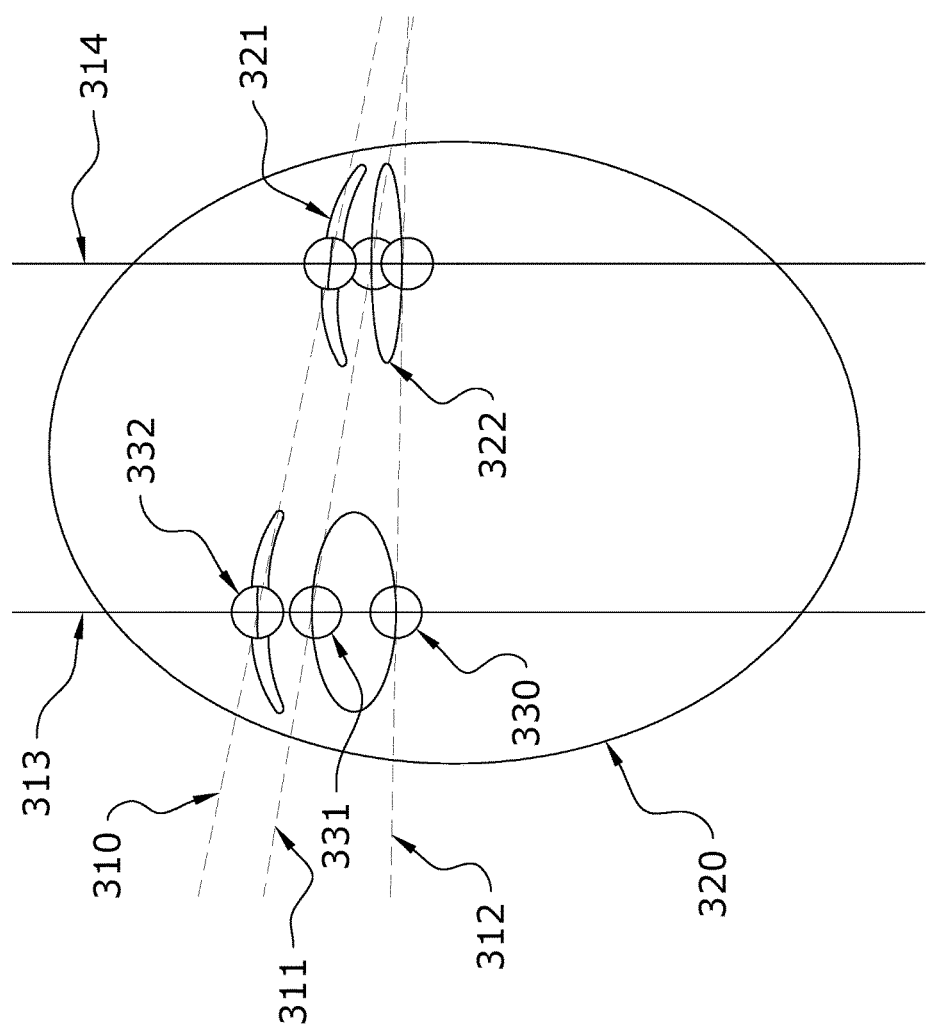
FIG. 3 is a frontal view illustrating parameters relevant for optical wink detection.

FIG. 3 illustrates an exemplary method for detecting winking and squinting gestures through use of rear-facing cameras 120. For mapping purposes, lines 310, 311 and 312 are drawn between equivalent points on both sides of the face. The angles of these lines to the verticals 313, 314 are measured. It is these angles which can be used to estimate whether a wink gesture event has taken place, what side of the face the wink gesture event has occurred and what amplitude and duration the gesture event has exhibited. An alternative embodiment of this method would involve measuring the distances between the said reference points and use the ratios of these measurements from either side of the face to estimate whether a wink gesture event has taken place, what side of the face the gesture event has occurred and what amplitude and duration the wink gesture event has exhibited.

ii. Electromyographic Wink Gesture Detection System

Figure 4:
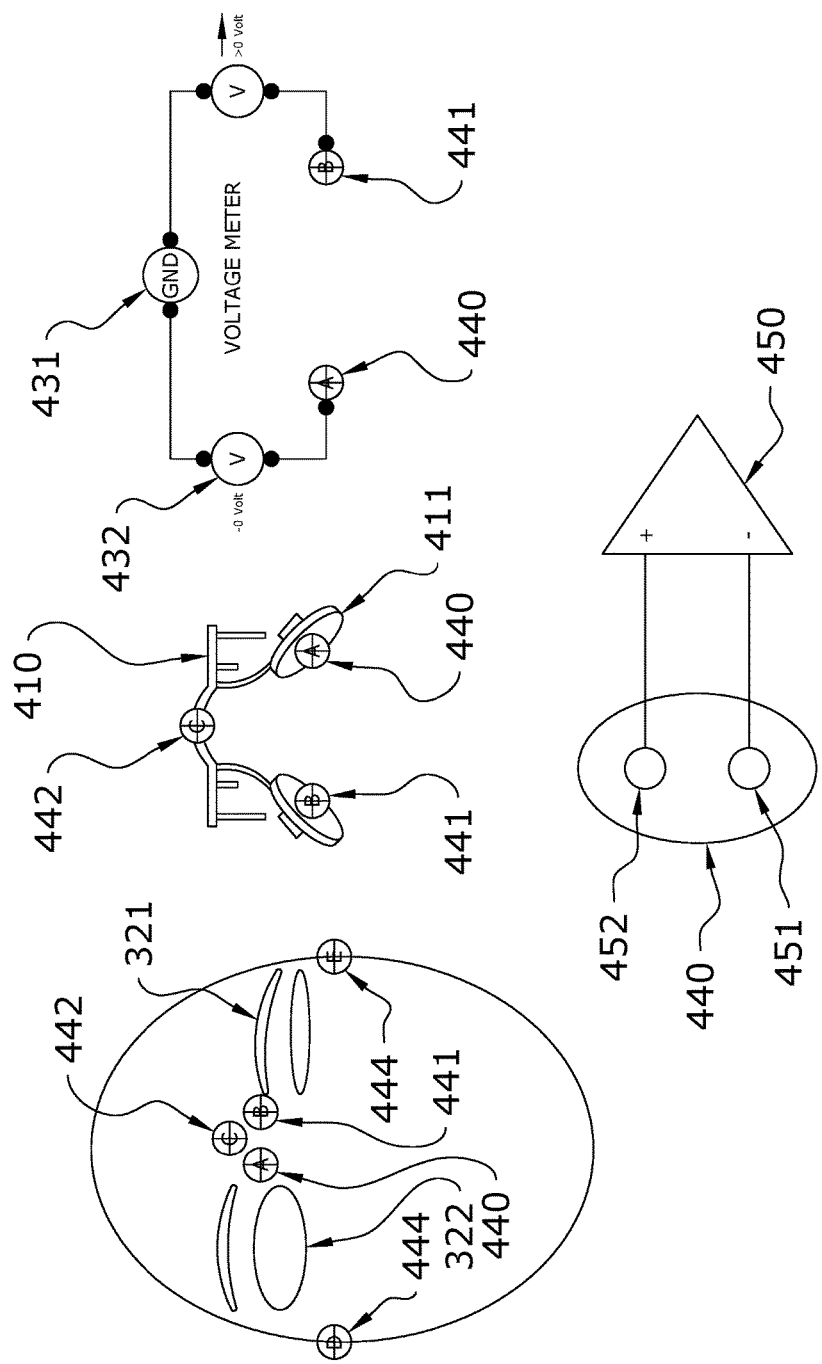
FIG. 4 illustrates electrode positioning for use in wink detection.

FIG. 4 depicts a system for implementing a wink gesture detection system by using electromyography (EMG). EMG generally necessitates the use of either surface or needle electrodes. The electrodes 440, 441, 442, 443 and 444 are all surface electrodes, such as electrodes based on silver nanowires for example, though other types may be utilized. Silver nanowire sensors are as accurate as the wet electrode sensors used in hospitals but are more accurate when the user is moving and as such they are particularly suitable for use in a wink gesture detection system.

The EMG-based wink gesture recognition system generally requires at least one reference electrode and a plurality of signal electrodes. As shown in FIG. 4, an exemplary embodiment has a first electrode 440 on a first side of the nose, a second electrode 441 on a second side of the nose, and a third electrode 443 on the bridge of the nose. As shown in the figures, the electrodes 440, 441 may be integrated with or connected to a nose pad 411. Electrode 442 may be integrated with or connected to a nose bridge 410.

Electrodes 442 and 444 would be particularly suitable for use as reference electrodes. Electrode 442 may be used as either a reference electrode or a signal electrode. If used as a signal electrode, electrode 442 is particularly suited for detecting a frowning-type facial gesture.

Electrodes 440 and 441 are the primary signal electrodes for wink detection. A wink is detected if a suitably normalized voltage differential is observed by a special processor which takes as input the voltages 432 measured through the signal electrodes, in reference to a ground 431. For better signal quality and in order to minimize the movement artifacts which are generated by the movement of the electrode with respect to the skin, both high-pass signal filtering and use of an active electrode is envisaged. An active electrode is a design whereby the input amplifier 450 is put on the electrode 440 and where the electrode has two or more connectors 451, 452 where direct skin contact is established. The connectors 451, 452 are in turn connected to an amplifier 450. This permits differential amplification to be used to ensure minimal distortion and the highest possible signal-to-noise ratio for the electrodes 440, 441, 442, 443, 444.

In one embodiment, two signal electrodes 440, 441 may be brought into contact with the user's skin on or near the temples on each side of the face. In some embodiments, at least four signal electrodes 440, 441, 442, 443 may be brought into contact with the user's skin, including areas on each temple and each side of the nose. The reference electrodes 440, 441, 442, 443 may contact above the ears or on the nose bridge, among other locations which exhibit minimal movement.

C. Controlling Smart Applications by Facial Gestures.

One of the prime reasons for equipping an HMD 240 with the sensors described herein is to enable the control of smart applications hosted on an HMD 240 with an integrated display. When controlling a computer application of any kind, it is of central importance to be able to select items from lists and to be able to enter numeric or alphanumeric data. The present invention has put particular emphasis on providing methods which allow the control of a smart application either assisted by wink gestures, or by wink gestures alone. The aim was to determine the fastest and ergonomically optimal solution for interacting with an HMD-hosted smart application by means of wink gestures.

Probably one of the central problems for any user interface is how to display a list of items, iterate through that list on a display and let the user select a list item. A list may, for example, consist of menu items or a sequence of allowed input for a given input field.

Figure 5:
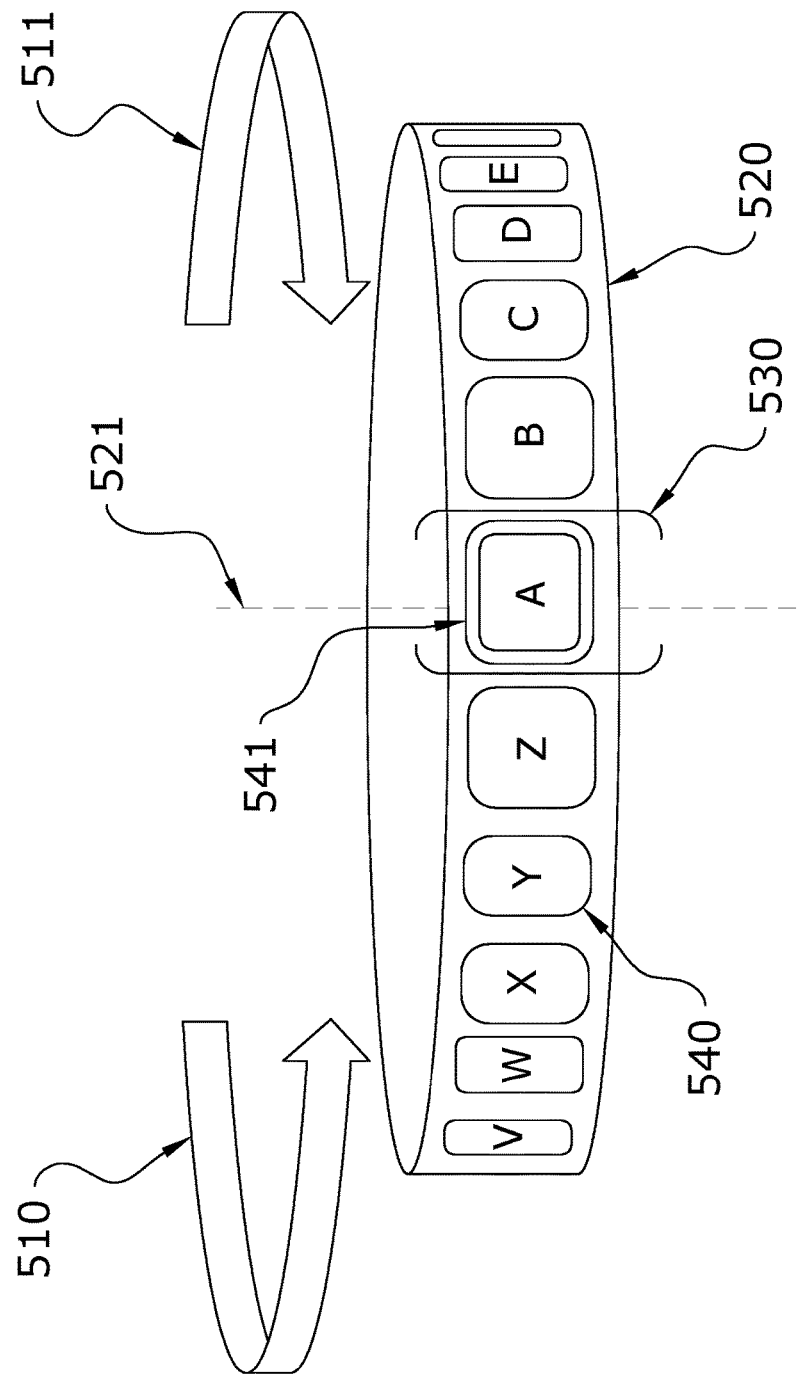
FIG. 5 is a frontal view of a rotating cylinder region of interest.

FIG. 5 depicts a symbol wheel 520 which is a data entry paradigm of particular significance in the context of the present invention. A symbol wheel is a simulated wheel rotating around a central axis 521. Attached to the outside of the wheel are symbol cards 540. It needs to be emphasized that the purpose of the wheel paradigm is to allow the user to preview the next symbols before they reach the selector window 541. It is not necessary to simulate a physical wheel with mathematical precision. It is sufficient in the context of the invention that the moving object gives the user the general impression of a rotating wheel. The wheel is moved by applying simulated torque 510, 511 in either direction of spin. A symbol card is selected when the wheel comes to rest and a particular symbol card is visible in the selector window. The visible card then has the active focus 541.

Figure 6:
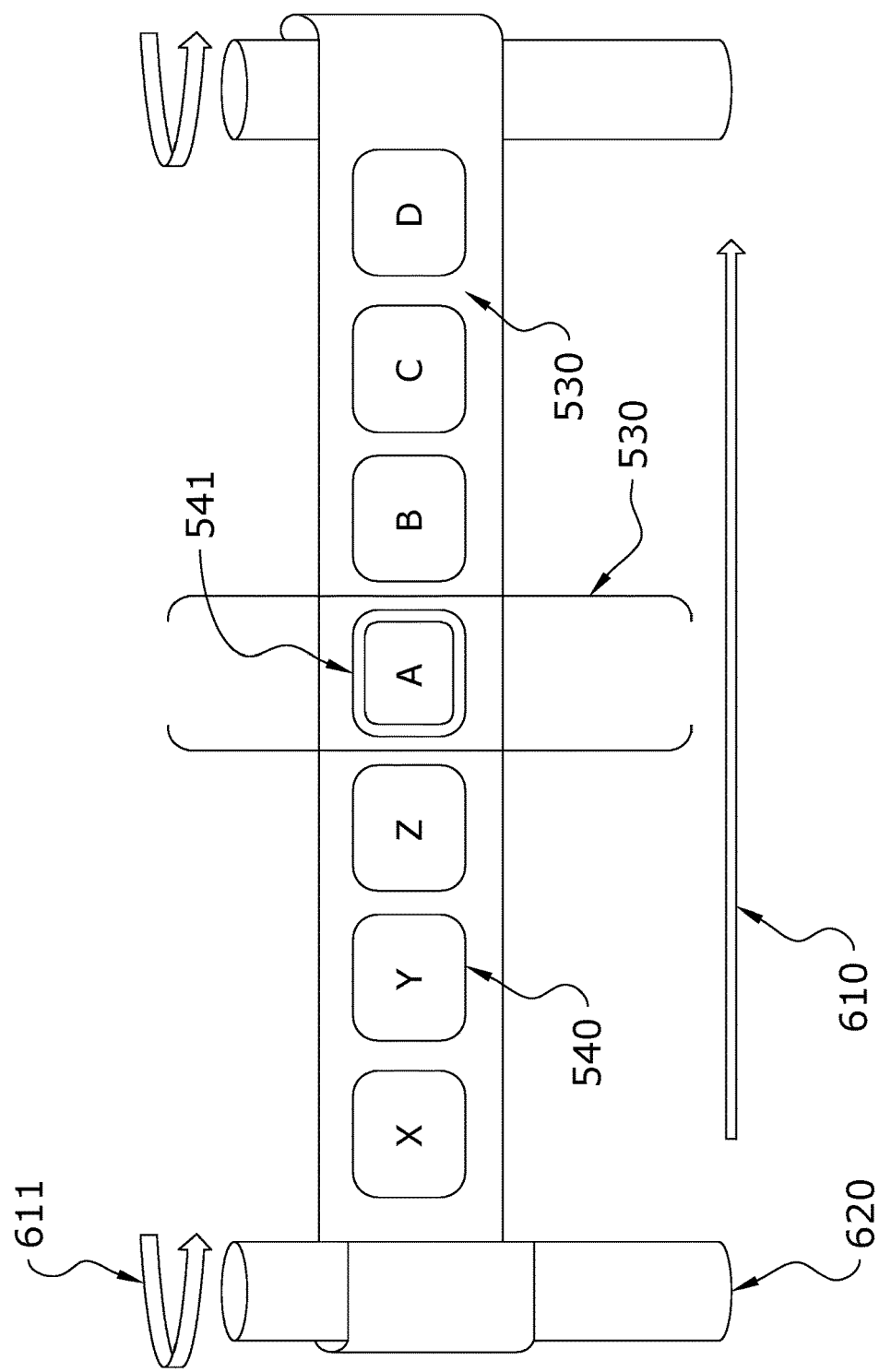
FIG. 6 is a frontal view of a scrolling region of interest.

FIG. 6 depicts an alternative embodiment of an HMD-capable list selector. This list selector is based on the paradigm of a moving scroll 530, 620. The main differences between the scroll and wheel paradigms are that a scroll is finite in either direction 610, 611, whereas a wheel can be spun indefinitely. Moreover a wheel can preview more symbols than a scroll since the simulated perspective makes symbols progressively smaller the nearer one gets to the top of the wheel.

Figure 7:
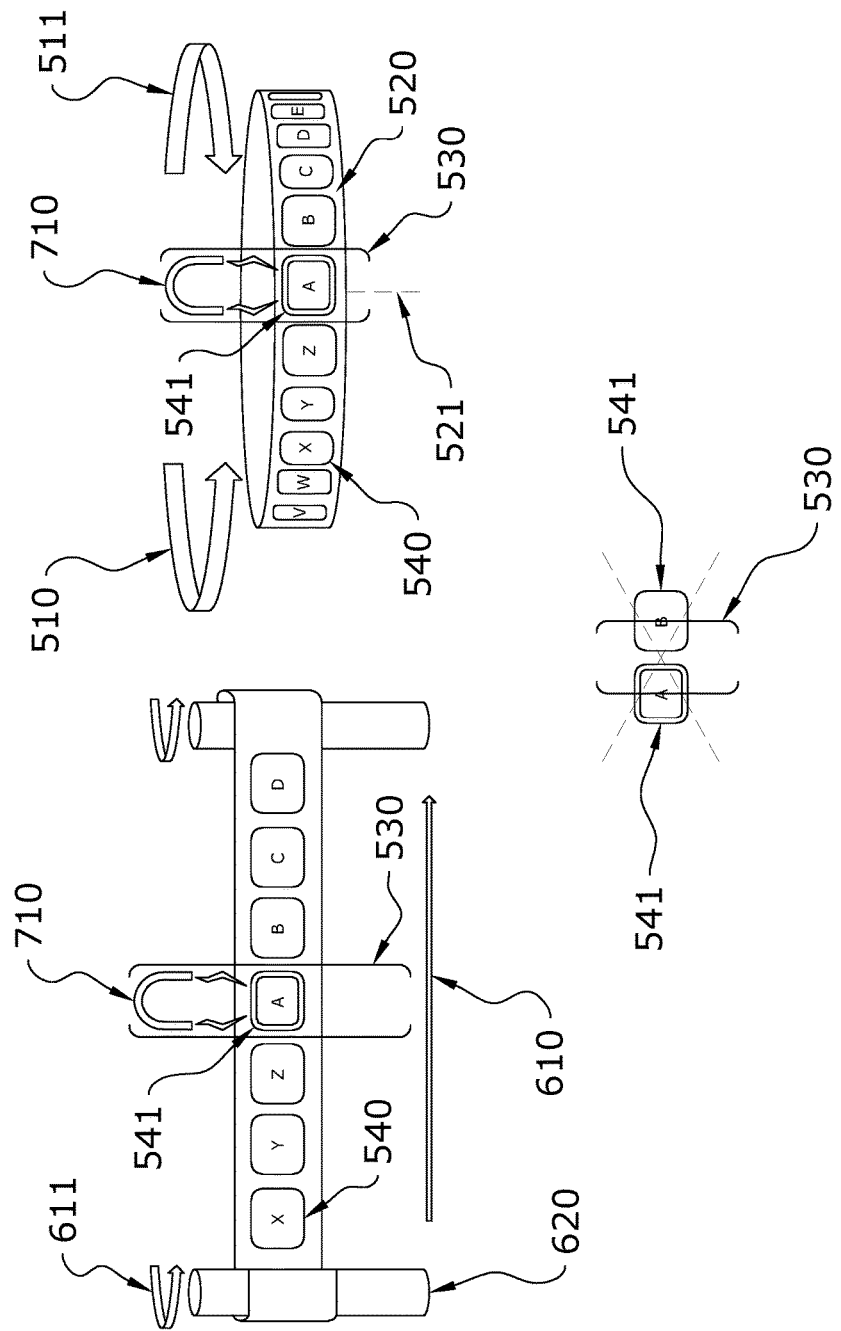
FIG. 7 is a frontal view of both rotating and scrolling region of interests utilizing simulated magnetic attraction.

A general problem with both scroll and wheel based list selection is the problem of how to ensure that only one symbol can come to rest in the selector window 530 when the moving object comes to rest. FIG. 7 shows how this problem can be solved with simulated magnetic attraction 710 when in analogy to a slot machine the wheel can only ever stop on a specific symbol card.

The present invention envisages that both wheels and scrolls are moved by applying simulated torqued which is in turn commanded by scalar inputs such as scalar-capable wink gestures, i.e. gestures which have either an amplitude or duration from which the amount of simulated torque can be derived. However, it should also be appreciated that binary inputs (parameterless events) or vector inputs (events which have parameters exhibiting both direction and magnitude) may also be utilized by the present invention.

Figure 8:
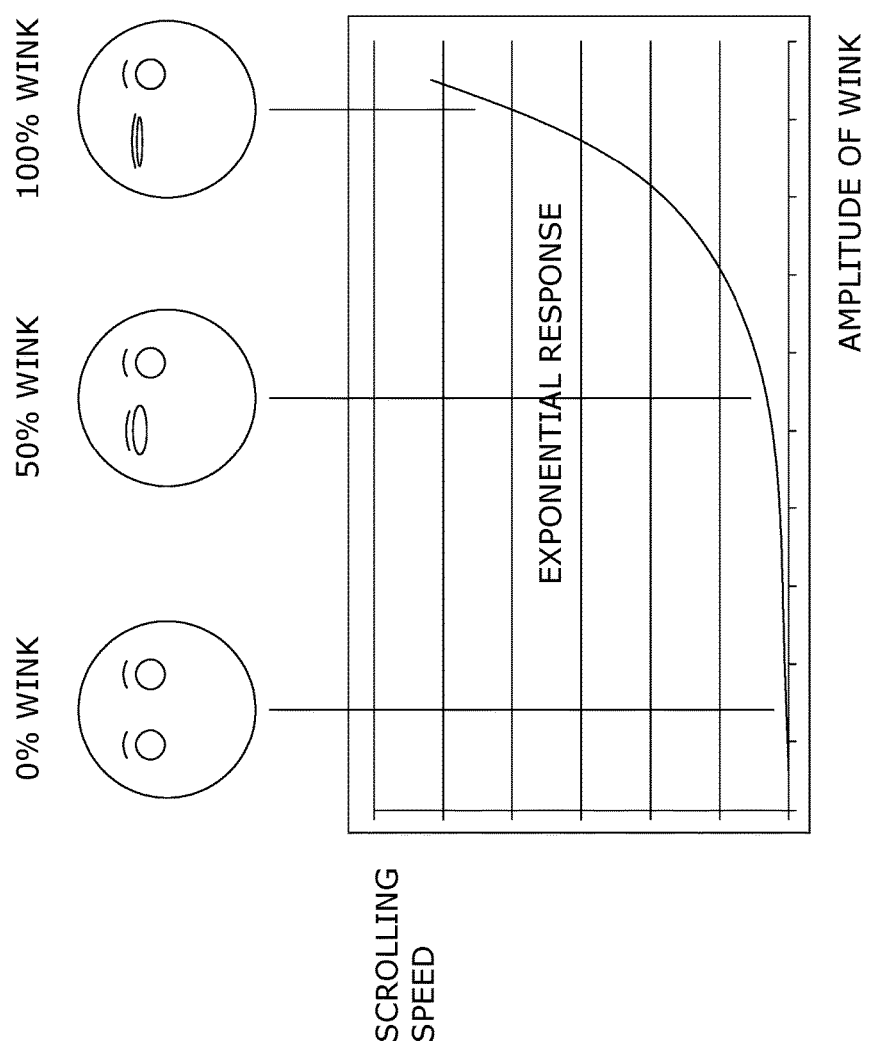
FIG. 8 is a graph illustrating the correlation between scrolling speed and wink amplitude in one embodiment of the present invention.

FIG. 8 illustrates that an exponential relationship is suggested when translating the scalar value of the gesture control input into an equivalent amount of simulated torque. The scalar component of the control input may be a function (linear or exponential) of the amplitude of the wink gesture. The amplitude of such a wink gesture is determined by measuring the degree of facial distortion associated with the wink gesture.

Figure 9A:
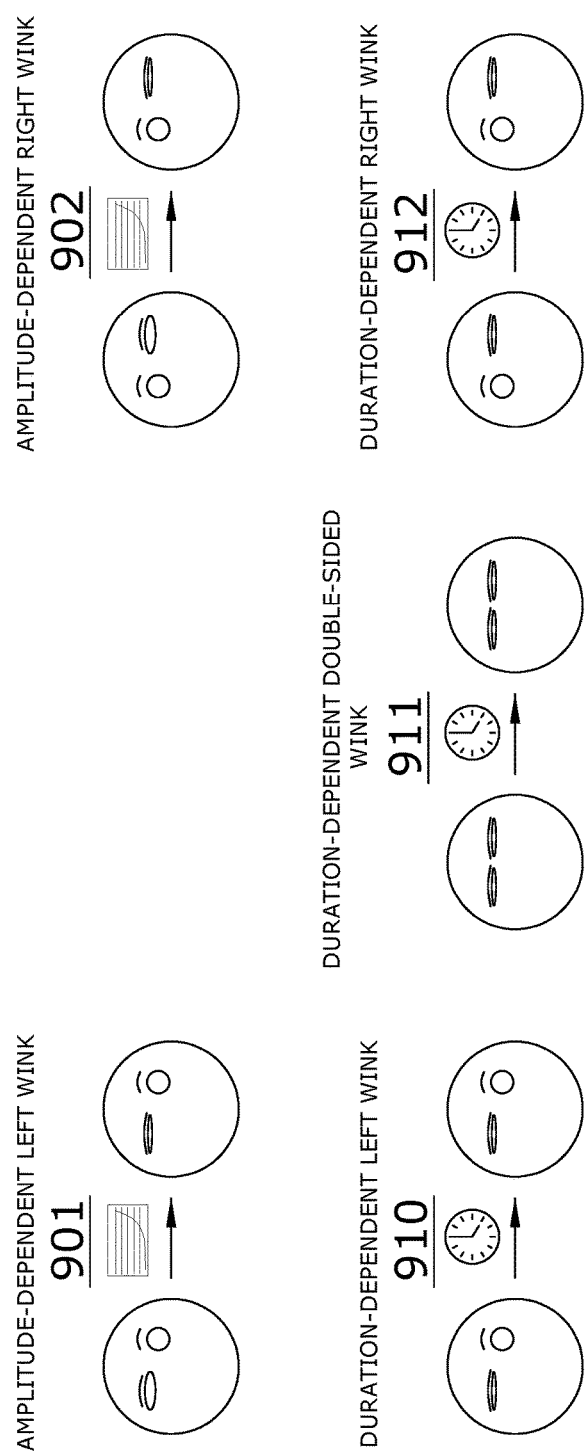
FIG. 9A is a first exemplary diagram illustrating potential wink input types.

FIGS. 9A and 9B specify the control inputs intended to be used with the present invention. It is emphasized that the control inputs specified in FIGS. 9A and 9B are not intended to be restrictive in the sense that they may be supplemented with further wink gestures or other control input not based on wink gestures.

FIG. 9A illustrates exemplary wink gestures which deliver a scalar value designating the magnitude of the control input. The scalar-capable control inputs are further differentiated into duration-based and amplitude-based inputs. The former comprise of the amplitude-dependent left wink 901 and the amplitude-dependent right wink 902. The latter comprise of the duration-dependent left wink 910, the duration-dependent double-sided wink 911 and the duration-dependent right wink 912.

FIG. 9B illustrates exemplary non-parametrized gestures, i.e., gestures which exhibit no intrinsic scalar value. These gestures comprise of the left single wink 920, the double-sided single wink 921, the right single wink 923, the left double-wink 930 and the right double-wink 931. It should be appreciated that the figures are not exhaustive as to types of wink gestures which can be recognized. For example, wink gestures that may be recognized may comprise, without limitation, a short single-sided single-squint; short single-sided double-squint; duration-based single-sided squint; duration-based double-sided squint; amplitude-based single-sided squint.

Figure 10A:
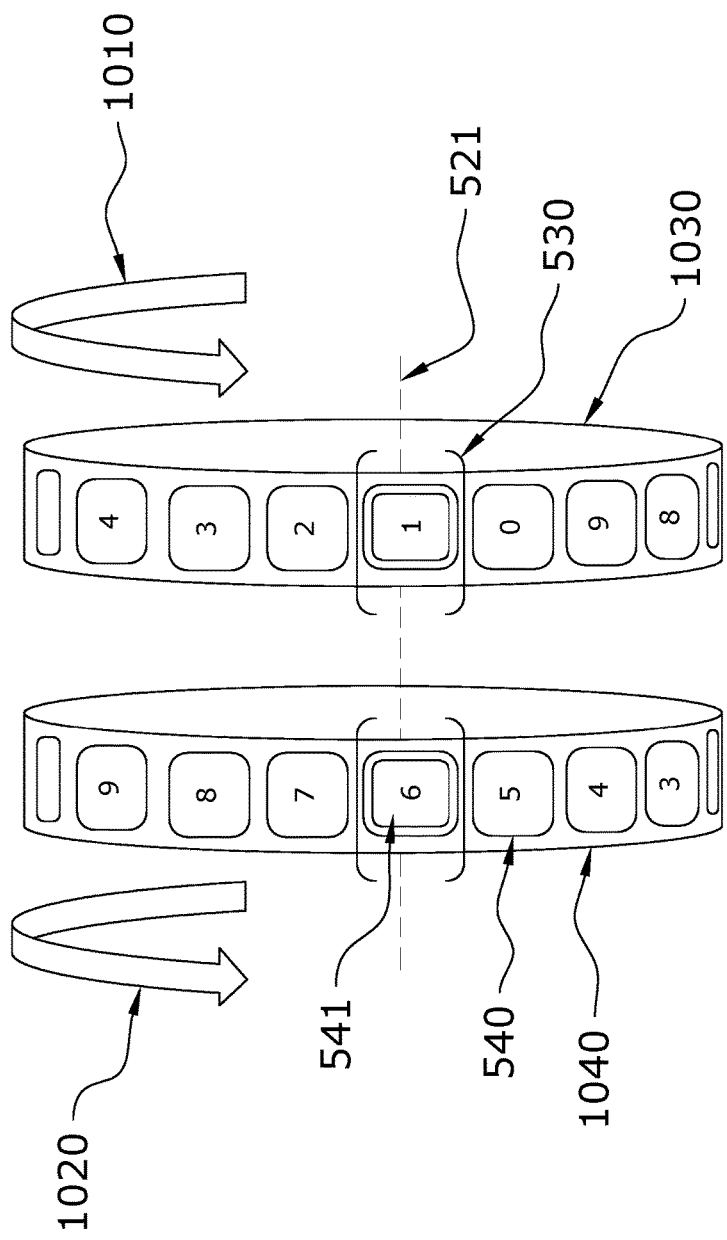
FIG. 10A is an illustration of a two-digit numeral input region of interest.
Figure 10B:
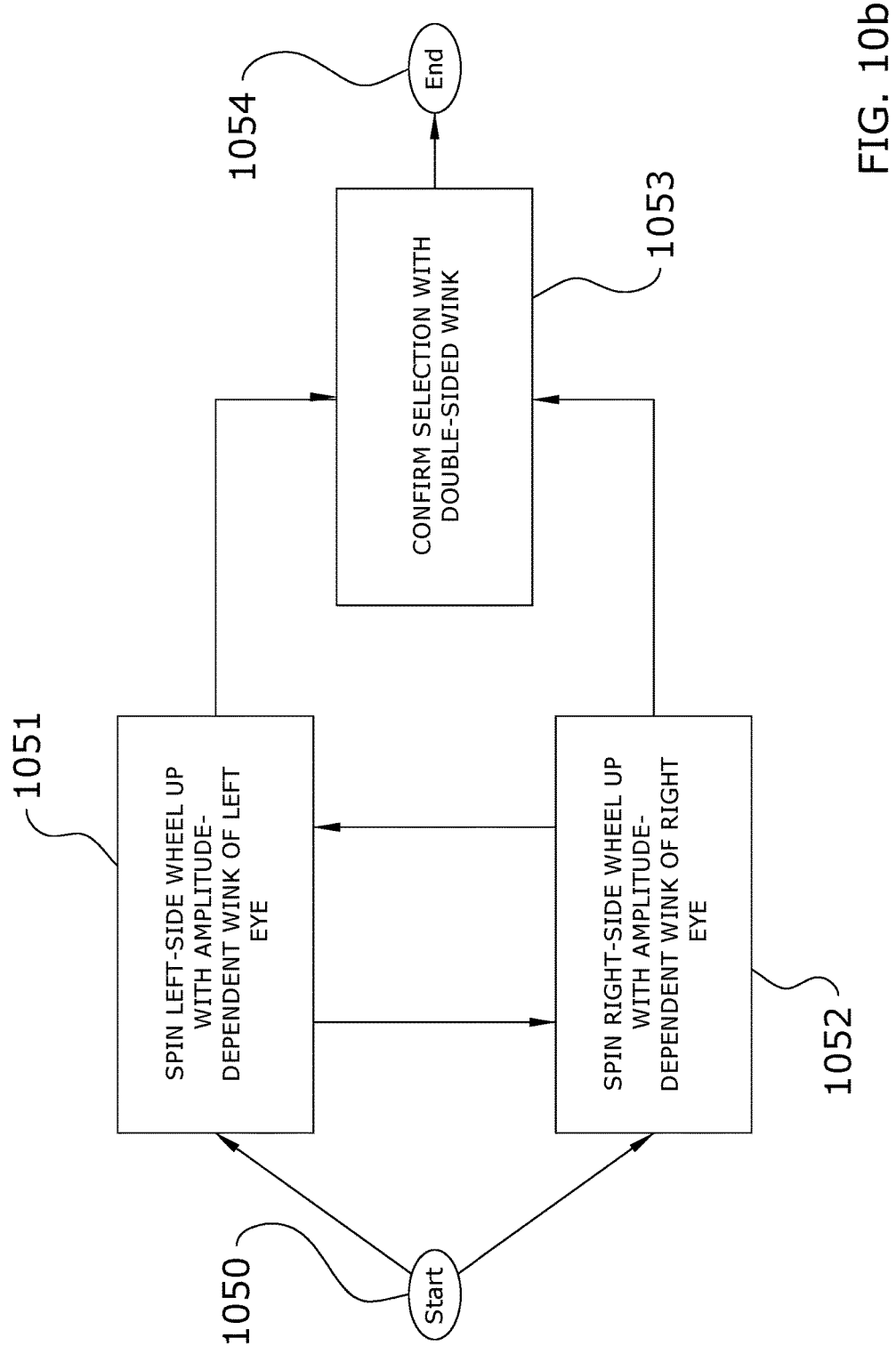
FIG. 10B is a flow chart illustrating two-digit numeral input via winks.

FIG. 10A shows an embodiment whereby the task is to select from two lists simultaneously. An example would be the input of a two digit number. To achieve this task with the minimum amount of control input, two symbol wheels are utilized, which are each populated with the full set of single digit numbers. Both symbol wheels can be spun in one direction only by applying simulated torque 1010, 1020 through a wink gesture. The wink gestures used in this embodiment are the amplitude-dependent left wink 901, which controls the left wheel 1040, and the amplitude-dependent right wink 902, which controls the right wheel 1030. The flow diagram of FIG. 10B further illustrates the described concept in that the start 1050 may consist of either spinning the left 1040 or the right wheel 1030. The wheels can be spun repeatedly in any sequence until the selection procedure is terminated 1053, 1054 by a double-sided single wink 921 which confirms the selection.

Figure 11A:
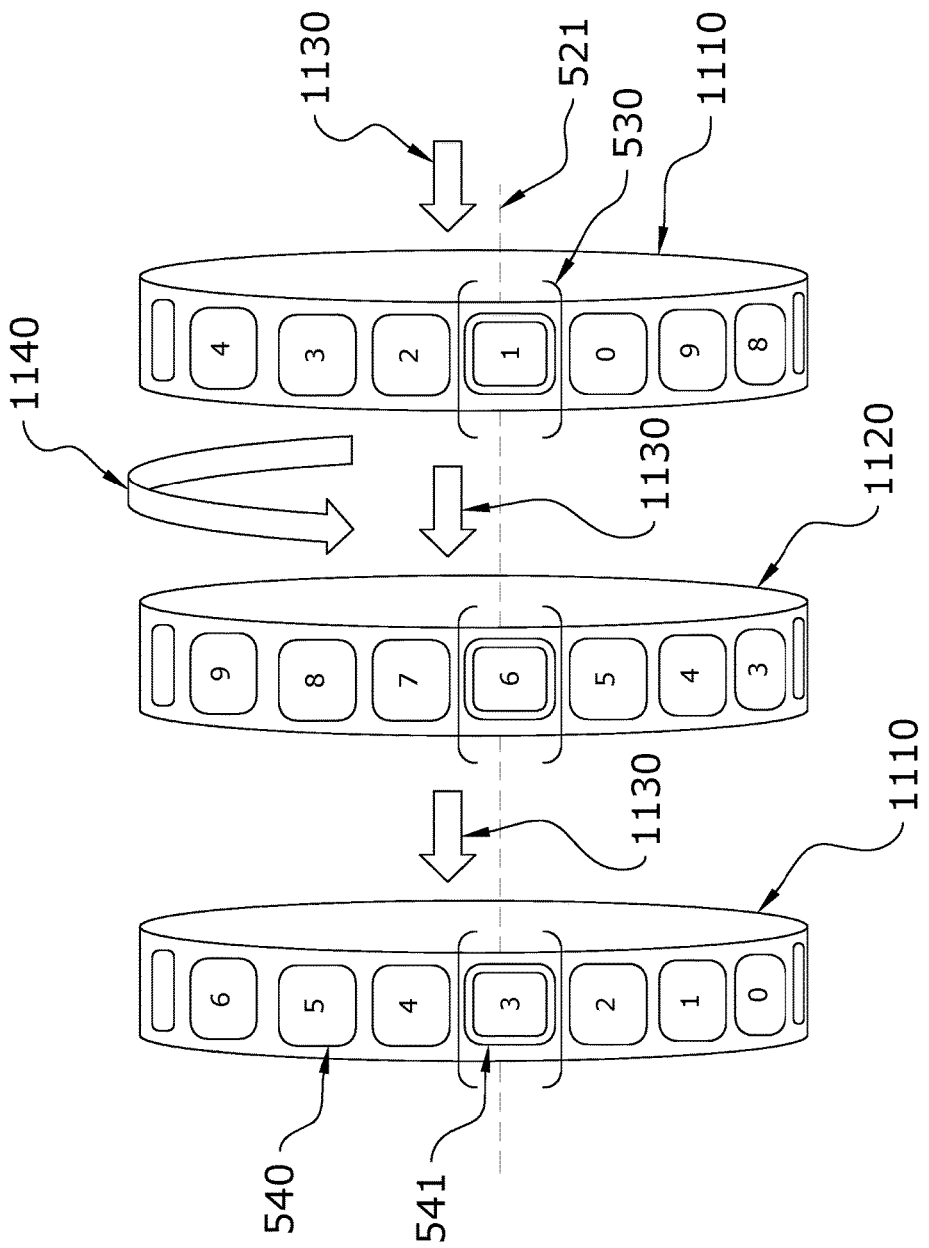
FIG. 11A is an illustration of a three-digit numeral input region of interest.
Figure 11B:
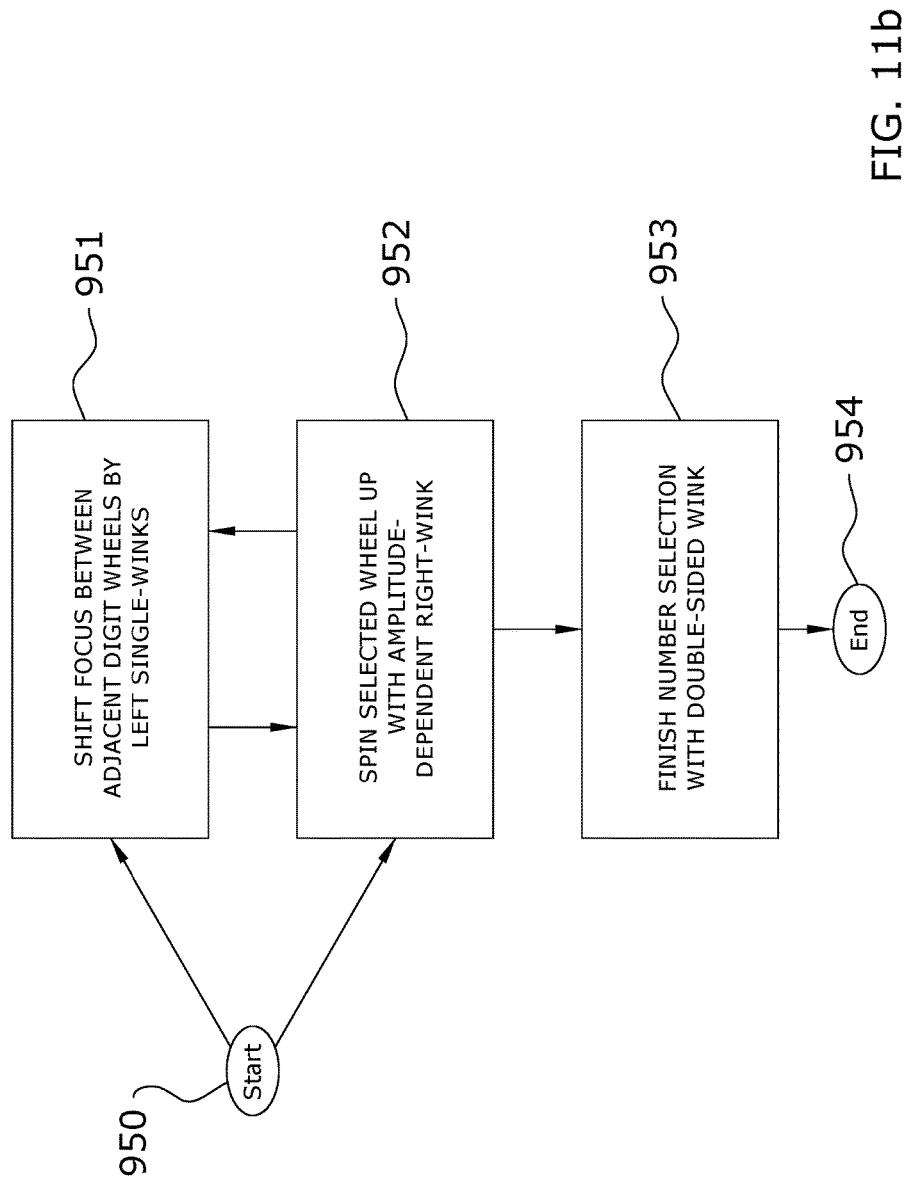
FIG. 11B is a flow chart illustrating three-digit numeral input via winks.

FIG. 11B represents a variation of the concept illustrated by FIG. 10 in that more than two symbol wheels are used to make numeric input. Once more than two symbol wheels are used it is no longer possible to associate a symbol wheel with a particular eye and a method 1130 is required to define an active wheel 1120 and to shift the active focus to a different wheel which was previously inactive 1110. It is only the active wheel which can be spun by simulated torque 1140 applied by means of an amplitude-dependent wink gesture. The flow diagram of FIG. 11B illustrates this concept. From the start 950 of the selection procedure the user can either skip the active focus to a different wheel 951 or spin the active wheel by means of an amplitude-dependent gesture 952. At the end 954 of the procedure the selection is confirmed 953 by a double-sided single wink 921.

Figure 12A:
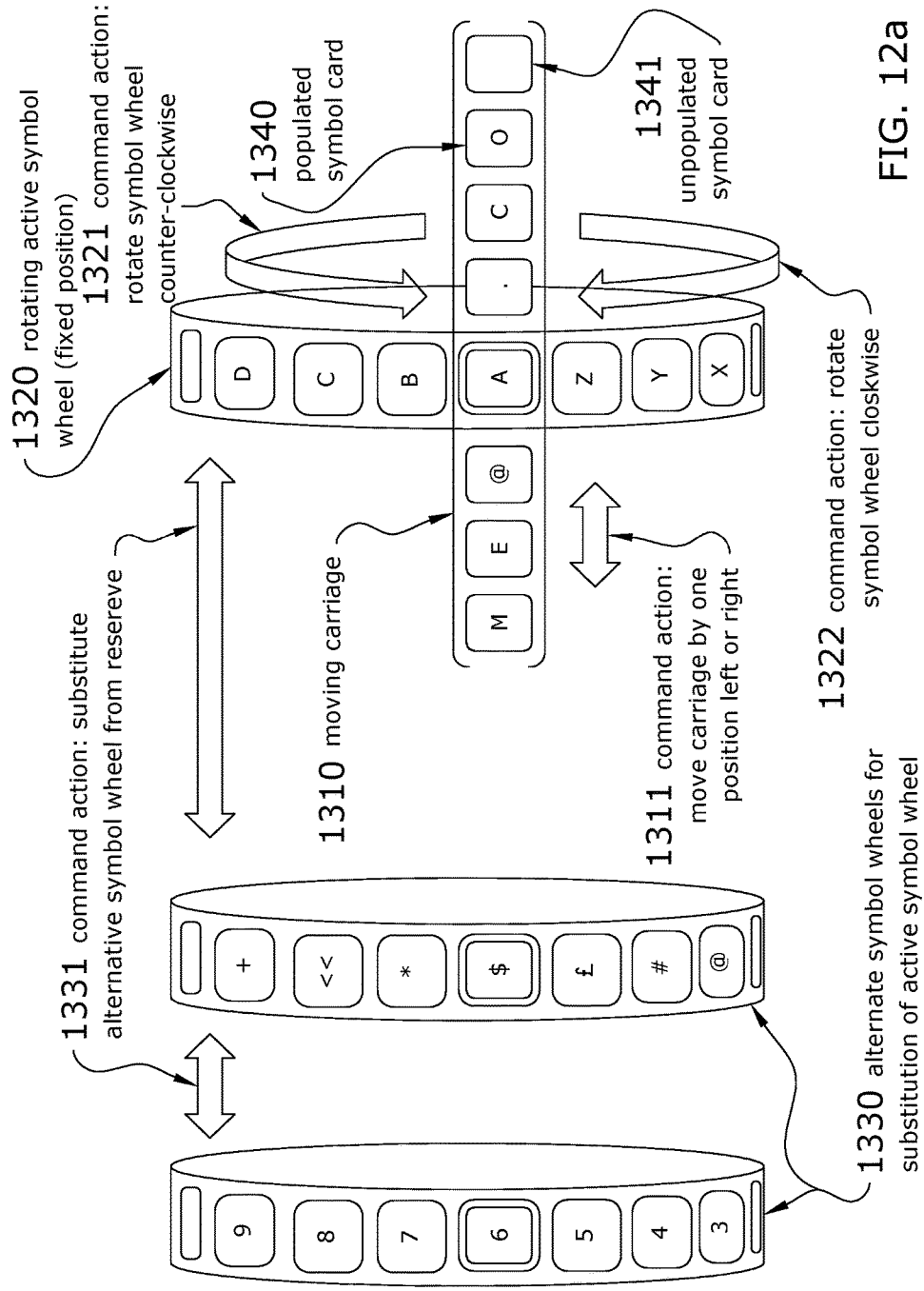
FIG. 12A is an illustration of a method for inputting alphanumeric character strings into a smart application hosted on a head mounted device by wink gestures.

FIG. 12A depicts another embodiment of the present invention whereby alphanumeric input is being entered by the exclusive means of wink gestures. This embodiment of the invention uses an input paradigm which is based on analogies with a classic mechanical typewriter featuring a moving carriage 1310. On the carriage there is a number of empty slots to take symbol cards. The number of empty slots 1341 is equal to the number of characters in the string which is to be input. There is one single active wheel 1320 which is fixed in position behind the moving carriage. The active symbol wheel may be substituted by a plurality of alternative symbol wheels 1330. The command actions available when entering alphanumeric input are the following: substitute alternative symbol wheel 1331, move carriage by one position (left or right) 1311, rotate wheel clockwise 1022, rotate wheel counter-clockwise 1021 and confirm input.

Figure 12B:
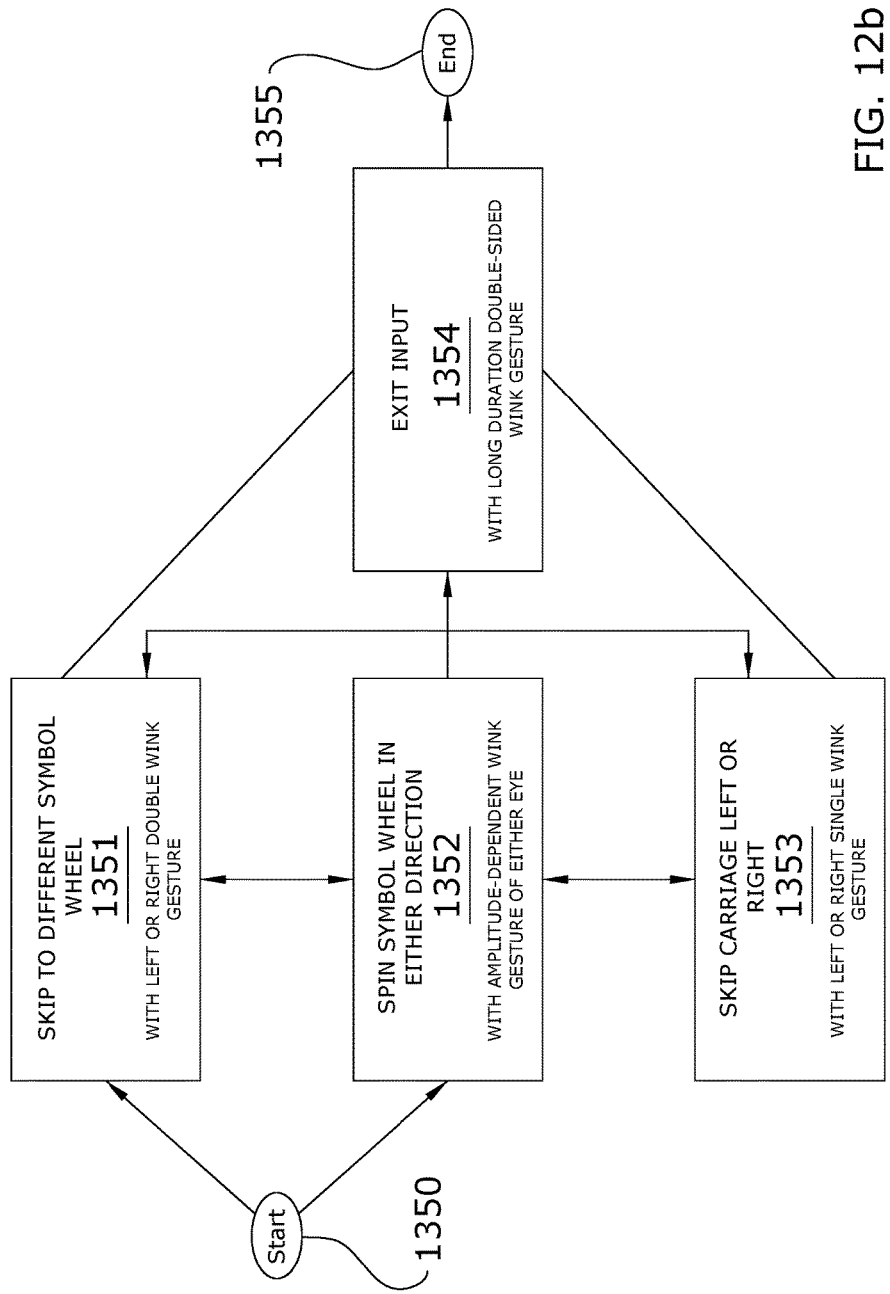
FIG. 12B is a flowchart illustrating a method for inputting alphanumeric character strings into a smart application hosted on a head mounted device by wink gestures.

The flowchart of FIG. 12B illustrates the control flow of the described embodiment. Similar to the embodiments described previously the active symbol wheel may be spun by amplitude-dependent gestures 1352. What is different to the previous examples is that another symbol wheel may be substituted 1351. This may be achieved by performing either a left or right double-wink gesture. A left-wink gesture implies that the set of alternative symbol wheels is iterated towards the left, whereas a right-wink gesture implies an iteration towards the right. Left and right single-wink gestures are reserved to move the carriage by one position 1353. A left single-wink gesture implies moving the carriage one position to the left, whereas a right single-wink gesture implies moving the carriage by one position to the right. Similar to the previous embodiments, a double-sided single wink confirms the inputs and lets the user exit the input mode 1354, 1355.

D. Regions of Interest, Points of Interest and Augmented Reality Objects.

Some embodiments allow for interacting with a head mounted display to select point-of-interest and augmented reality targets. When detecting a human wink gesture, the system can trigger a head mounted display to select a subset of the points or interests or augmented reality targets within the region of interest in the field of view. The regions of interest may be adjusted by wink gestures which have been detected and interpreted by the head mounted device.

The various embodiments include methods of selecting augmented reality targets, including defining a region of interest based on user's wink gestures by capturing spatial data with one or more head mounted sensors, displaying a shape outlining the region of interest on the display of the head mounted display, calculating parameters including distance with respect to the head mounted display that corresponds to the augmented reality targets, displaying a plurality of virtual objects within the region of interest, reducing the size of the region of interest based on the amplitude or duration of the user's face gesture input and using a reduced-sized region of interest to select a specific virtual object target.

A user may select a specific layer of region of interest or object target augmentation by first selecting the region of interest using face gesture inputs. In case multiple augmentations such as virtual objects are overlayed onto the selected augmented reality target, the user can iterate through them in the direction of the target using either amplitude-sensitive face gestures 901, 902 or duration-sensitive gestures 910, 912. The direction can be set on the basis of whether the winking movement occurs on the left or right side of the face. The speed of the iteration can be controlled by the amplitude or duration of the wink gesture.

According to another embodiment, the system can start, control and terminate head mounted display-based or mobile applications based on wink gestures. For example following a cue by wink gesture, a region of interest can be defined as an input area for an optical character recognition (OCR) translation system. Another wink gesture may be used to either terminate the smart application or to shut down the head mounted display itself According to another embodiment, the wink gestures can be utilized to narrow or widen the field of view (zooming) for video sharing or image/video capture depending on the side (left or right eye) and amplitude of the wink gesture. The wink gestures can be utilized to focus the field of view for video or still image capture; thus controlling the focus and/or field depth of the camera depending on the amplitude of the wink gesture. An example would be a frontal-facing head mounted display camera on which the user can manually adjust the focus by amplitude-dependent wink gestures.

According to another embodiment, the described wink gestures can be used to control smart applications on the head mounted display using the usability paradigm of a computer mouse. Analogous to a traditional computer mouse, with its left-clicks, right-clicks, single-clicks and double-clicks, there can be left-wink, right-wink, single-wink and double-wink gestures with the same semantics of the corresponding computer mouse operations as shown in the figures. This mode of operation is of particular significance when eye movements of the user are tracked (for example by sophisticated electrooculography-based methods) and translated into the movement of a mouse pointer in the field of view. Whenever the mouse pointer hovers over a surface suitable to be clicked on, the necessary click-action can be commanded using the described wink gesture inputs.

In another embodiment, real-world text (such as signage) may be captured within the region of interest by wink gestures. A second facial gesture may then be utilized to initiate a translation based on the captured text, which is displayed to the user via the head mounted display. For example, a first set of wink gestures may be provided to capture the text within the region of interest, and a second wink gesture may be provided to initiate the translation. Other wink gestures may be utilized to enlarge, reduce, or move the region of interest to capture more or less text. Additional wink gestures may be utilized to perform a visual recognition search within the region of interest or to disengage the region of interest.

Unless otherwise defined, all technical and scientific terms used herein have the same meaning as commonly understood by one of ordinary skill in the art to which this invention belongs. Although methods and materials similar to or equivalent to those described herein can be used in the practice or testing of the wink gesture based control system, suitable methods and materials are described above. All publications, patent applications, patents, and other references mentioned herein are incorporated by reference in their entirety to the extent allowed by applicable law and regulations. The wink gesture based control technique may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method comprising:
   detecting at least one wink gesture; and
   determining parameters intrinsic to the at least one wink gesture; and
   controlling a user interface of a computer system in response to detecting the at least one wink gesture; and
   wherein controlling the user interface of a computer system in response to detecting the at least one wink gesture further comprises displaying list items as a plurality of virtual symbol cards attached to at least one virtual object, wherein movement of the at least one virtual object is controlled in response to the at least one wink gesture; and
   wherein the direction of the movement of the at least one virtual object is determined by the side of the face on which the at least one wink gesture is made; and
   wherein the movement of the at least one virtual object further comprises simulated torque being applied; wherein the magnitude of the simulated torque is derived from a function of the magnitude of the at least one wink gesture; and wherein the function of the magnitude of the at least one wink gesture comprises both linear and exponential functions.

2. The method of claim 1 further comprising:
   selecting one of the at least two symbol cards when the movement of the at least one virtual object ceases; and
   configuring the movement of the at least one virtual object so that the selecting of one of the at least two symbol cards always yields an unambiguous selection.

3. The method of claim 1 further comprising:
   designating one of the plurality of virtual objects as the active object;
   selecting one other of the plurality of virtual objects with the at least one wink gesture; and
   designating the selected virtual object as the new active virtual object.

4. The method of claim 3 further comprising:
   entering alphanumeric input into the user interface of the computer system, wherein entering the alphanumeric input comprises:
   controlling both a simulated typewriter carriage and the at least one virtual object carrying the at least two symbol cards with the at least one wink gesture; and
   transposing the symbol of the selected symbol card to the simulated print position on the simulated typewriter carriage; wherein the simulated typewriter carriage comprises a virtual object capable of attachment of a plurality symbol cards; wherein the simulated typewriter carriage is capable of movements from the list consisting of moving one print position to the left, moving one print position to the right, and returning n print position to the initial start position.

5. The method of claim 1, wherein controlling the user interface of a computer system in response to detecting the at least one wink gesture further comprises a method for selecting an augmented reality object comprising:
   defining a region of interest based on the at least one wink gesture;
   displaying to the user a shape, wherein the shape outlines the region of interest;
   displaying to the user a plurality of augmented reality objects, each of the plurality of augmented reality objects being associated with a target inside the region of interest; and
   reducing or enlarging the size of the regions of interest based on the magnitude of the at least one wink gesture to form a reduced/enlarged-sized region of interest, wherein the reduced/enlarged-sized region of interest is used to select a specific augmented reality object from the plurality of augmented reality objects.

6. The method of claim 5, wherein multiple augmentations are associated with the specific AR object, the method further comprising:
   displaying to the user a corresponding augmentation from the multiple augmentations associated with the specific augmented reality object commanded by a second wink gesture.

7. The method of claim 5, further comprising:
   capturing text inside the reduced-sized region of interest and initializing translation based on the captured text commanded by a second wink gesture.

8. The method of claim 5, further comprising:
performing a visual recognition search inside the reduced-sized region of interest commanded by a second wink gesture.

9. The method of claim 1, further comprising:
iterating through a plurality of virtual objects, comprising the steps of:
deriving a vector from the at least one wink gesture, wherein the side of the face on which the at least one wink gesture takes place determines the direction of the vector and wherein the magnitude of the wink gesture determines the magnitude of the vector; and
controlling the direction of the iteration by the direction of the vector and; and
controlling the speed of the iteration by the magnitude of the vector.

10. A non-transitory computer-readable medium having stored therein instructions that, upon execution by a computing device, cause the computing device to perform functions comprising:
detecting a wink gesture at a head mounted device, wherein detecting a wink gesture comprises:
determining intrinsic parameters of the wink gesture wherein the intrinsic parameters are selected from the list comprising: duration of the wink gesture, magnitude of the wink gesture, side of the wink gesture; and
translating scalar values of the intrinsic parameters of the plurality of wink gestures to corresponding magnitudes of control inputs relating to input parameters of the user interface of the computing device; and
translating the directional component of the intrinsic parameters of the plurality of wink gestures to corresponding direction of control inputs relating to input parameters of the user interface of the computing device; and
translating the magnitude of a wink gesture to a corresponding control input relating to input parameters of the computing device using an exponential function.

11. A head mounted device system, comprising:
a head mounted device;
a wink detection system that is connected to the head mounted device, wherein the wink detection system is adapted to detect a wink gesture at the head mounted device, wherein the wink detection system comprises a plurality of sensors selected from the group consisting of electromyography sensors, distance sensors, motion sensors, infrared cameras, visual-range cameras and any combination thereof, wherein the wink gesture detected is selected from the group consisting of amplitude-dependent single-sided wink, duration-dependent single-sided wink, single-sided single-wink, single-sided double wink and double-sided single wink;
a display; and
a non-transitory computer-readable medium having stored therein program instructions that, upon execution by a computing device, cause the computing device to perform functions comprising:
allowing the user to control smart applications through control inputs comprising the wink gesture and wherein the wink gesture can be used to achieve tasks from the following group consisting of resizing a virtual object, iterating between different virtual objects, shifting the active focus to a different virtual object, controlling movable virtual objects, and making or confirming selections;
setting intrinsic HMD parameters comprising adjusting the speaker volume and adjusting the brightness of the display; and
wherein the response to a wink gesture input may take into account parameters selected from the group consisting of magnitude of the wink gesture, duration of the wink gesture, number of repetitions of the wink gesture, the side of the face on which the wink gesture was performed, and any combination of the said parameters.

12. The system of claim 11 further comprising a simulated mouse-operated user interface system comprising:
an eye movement detection system that is connected to the head mounted device, wherein when the head mounted device is worn the eye movement detection system is adapted to detect the movement of the user's eyes, wherein user interface of the head mounted device is adapted to display a mouse pointer, wherein the mouse pointer is configured to be controlled by the movement of the user's eyes; and
wherein the functions of the simulated mouse-operated user interface system comprise: simulating a mouse-click when the wink gesture is performed, wherein the wink gesture is selected from the group consisting of a single left wink, a single right wink, a double left wink, and a double right wink.

* * * * *